United States Patent
Hanschke et al.

[11] 3,725,478
[45] Apr. 3, 1973

[54] POLYAMINES OF XYLENED AMINES

[75] Inventors: Ernst Hanschke, Burghausen; Walter Fester, Konigstein/Taunus; Franz Jakob, Hofheim/Taunus, all of Germany

[73] Assignee: Farbwerke Hoechst Aktiengesellschaft vormals Meister, Lucius & Bruning, Frankfurt/Main, Germany

[22] Filed: Aug. 19, 1970

[21] Appl. No.: 65,293

[30] Foreign Application Priority Data

Aug. 26, 1969 Germany............P 19 43 253.2

[52] U.S. Cl........260/570.5 P, 260/78 R, 260/563 R, 260/570.9
[51] Int. Cl.............................................C07c 87/28
[58] Field of Search..........260/570.9, 570.5 P, 563 R

[56] References Cited

UNITED STATES PATENTS 3,351,650   11/1967   Cross et al........................260/563 X

OTHER PUBLICATIONS

Tashiro et al., "Chemical Abstracts,"Vol. 67, 72996K, page 6853 (1967).
Hashimoto et al., "Chemical Abstracts," Vol. 66, 115108w, page 10679 (1967).

*Primary Examiner*—Robert V. Hines
*Attorney*—Curtis, Morris & Safford

[57] ABSTRACT

Polyamines of the formula

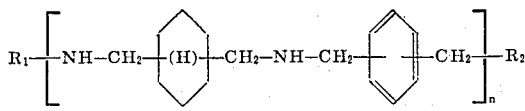

in which $n$ represents a whole number of from 1 to 10, preferably from 1 to 3, $R_1$ represents H or

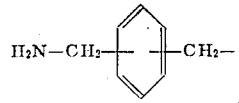

$R_2$ represents $NH_2$ or

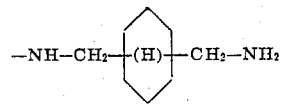

and the linkages of the rings are meta- and/or para-linkages and, to a small extent, also ortho-linkages. These polyamines are preferably prepared by desaminating hydrogenation of at least one of the isomeric m- and p-xylylene diamines, optionally in admixture with a small amount of o-xylylene diamine; they are suitable, for example, as modification components for the preparation of film and fiber-forming polyamides.

The rings in the said polyamines may also contain low molecular weight alkyl-substituted groups; this means, of course, that the starting substances for the preparation of the polyamines carry corresponding alkyl-substituents.

1 Claim, No Drawings

POLYAMINES OF XYLENED AMINES

The present invention relates to novel polyamines and to a process for preparing them.

Canadian Pat. No. 837,201 described a process for the preparation of polyamines by means of desaminating hydrogenation of xylylene diamine(s), in which process polyamines are formed, in the molecule chains of which the six-membered rings originating from xylylene diamine are all hydrogenated, i.e. cyclo-aliphatic. These polyamines are distinguished by a remarkable thermostability which makes them particularly suitable for numerous application purposes, for example for the modification of film and fiber-forming polyamides and as hardeners for epoxide resins.

Purely aromatic polyamines — in this connection the term also comprises those polyamines, in the molecule chains of which an aliphatic C-atom may be present every time between the aromatic nuclei and the amino groups, for example dixylylene triamine — do not exhibit this thermostability. They resinify at elevated temperatures, while showing a brown coloration and splitting off $NH_3$; they are, therefore, not suitable for many purposes.

Now it has been found that polyamines having partly aromatic and partly cyclo-aliphatic nuclei in the molecule chains, have, surprisingly, a very good thermal stability. The present invention provides, therefore, novel polyamines of the formula

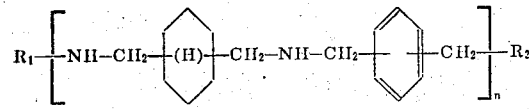

in which $n$ represents a whole number of from 1 to 10, preferably from 1 to 3, $R_1$ represents H or

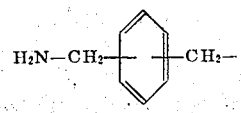

$R_2$ represents $NH_2$ or

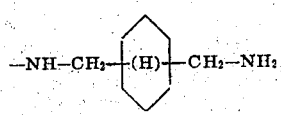

and the linkages of the ring are preferably meta- and para-linkages.

To prepare the novel polyamines, at least one of the isomeric m- and p-xylylene diamines — optionally in admixture with a small amount of o-xylylene diamine — is heated at a temperature in the range of from 150° to 190°C under hydrogen pressure of from 150 to 200 atmospheres gage, in the presence of a nickel catalyst which contains preferably small amounts of heavy metals, until there is a noticeable slow-down in the absorption of hydrogen.

In carrying out this process, m- or p-xylylene diamine, as well as mixtures of these xylylene diamines, are used as starting compounds. o-xylylene diamine is less suitable; it can also be used, however, in a small amount of at most 10 percent — in admixture with m- and/or p-xylylene diamine. A nickel hydrogenation catalyst is added to the starting xylylene diamine (mixture), advantageously in an amount of from 0.5 to 5 percent by weight, calculated on the starting substances; this nickel catalyst is particularly efficient if it also contains small amounts (up to about 3 percent by weight) of other heavy metals, such as copper, chromium, manganese, or cobalt. If such a nickel catalyst containing other heavy metals is used, higher yields of the desired polyamines are obtained than with a pure nickel catalyst. At a temperature in the range of from 150° to 190°C and a hydrogen pressure of from 150 to 200 atmospheres gage a desaminating hydrogenation is taking place, in the course of which the polyamines in accordance with the invention are formed. The reaction is stopped as soon as there is a noticeable slow-down in the absorption of hydrogen. This is the case, generally, if about half the amount of hydrogen necessary for the complete hydrogenation of the aromatic nuclei has been absorbed. Depending on the reaction conditions applied within the specified limits, the process can be performed in such a way that a largely uniform polyamine, or else a mixture of several substances falling under the general formula for the polyamines of the invention, is obtained. The working-up is effected advantageously by means of vacuum distillation, in which process the polyamines are obtained as a residue, after the more volatile substances have been distilled off. For some application purposes, this residue can be used without further distillation; it can also be separated into its individual components by further distillation.

If in the performance of the above-mentioned process no uniform xylylene diamine isomer has been used as starting compound, the linkages of the rings of the final product are, naturally, not uniform either, but are a mixture of para-, meta-and, optionally, ortho-linkages. It is possible to use, instead of the unsubstituted isomeric xylylene diamines, xylylene diamines that have been substituted preferably by low molecular weight alkyl groups having from one to five carbon atoms. In this case the corresponding polyamines have alkyl-substituted benzene and cyclohexane rings in the chain, instead of the unsubstituted rings in the formula for the polyamines according to the invention.

It is also possible to prepare the polyamines of the invention in a different manner, for example, by using as starting compounds the corresponding ω,ω'-dihalides and diamines and, optionally, ammonia. Thus, for example, p-xylylene-di(hexa-hydro-p-xylylene)-tetramine can be obtained from p-xylylene dichloride and hexahydro-p-xylylene diamine in a molar ratio of at least 1 : 2, according to processes common for reactions of this kind.

The polyamines of the invention are colorless, or at the most slightly yellow, completely liquid substances of a high thermostability. In contradistinction to the corresponding polyamines which also have aromatic rings in the molecule chains, instead of cyclo-aliphatic rings (for example dixylylene triamine), the novel polyamines do not show any signs of discoloration, nor do they decompose, when heated to about 200°C for a limited period of time. This fact is particularly surprising, as it was to be expected that the thermal properties of the partially hydrogenated polyamines in accordance with the invention would be, for example, a combination of the properties of the corresponding polyamines that are completely hydrogenated (i.e. which have exclusively cyclo-aliphatic rings), with those of the non-hydrogenated polyamines (i.e. which have only aromatic, but no cyclo-aliphatic rings in the chain). However, the outcome was beyond expectation, since the thermal properties of the partially hydrogenated polyamines of the invention are equal to those of the corresponding completely hydrogenated products which have no more aromatic nuclei in the molecule chain, if the number of amino groups is the same.

The structure of the polyamines of the invention was also confirmed by means of nuclear resonance spectroscopy.

The polyamines of the invention are suitable, for example, as modification components for the preparation of film and fiber-forming modified polyamides in accordance with U.S. Patent application Ser. No. 65,299 filed concurrently herewith, now allowed and entitled: "Fiber-forming polyamides with an increased content of amino groups."

The following Examples serve to illustrate the invention.

EXAMPLE 1

In a 50 liter autoclave provided with stirrer, a mixture was prepared consisting of 20 kg of a mixture of m- and p-xylylene diamine in a ratio of 7:3 and 1 percent by weight of Raney nickel, "type CO" of Messrs. Degussa (i.e. a nickel catalyst containing chromium and copper); this mixture was hydrogenated at a temperature in the range of from 170° to 190°C and a hydrogen pressure of 200 atmospheres gage. In the course of about 3 hours the hydrogen was absorbed very fast. The hydrogenation was stopped as soon as 50 percent of the amount necessary for the complete hydrogenation had been absorbed. After filtration of the reaction mixture, by-products having a low boiling point were distilled off under a pressure of 10 mm of mercury and a sump temperature of 170°C, the residue was then kept at 170°C for another 1 to 2 hours in order to separate small amounts of colloidially dissolved nickel. The precipitated nickel was filtered off with the addition of activated carbon. The remaining colorless polyamine had a nitrogen content of 14.8 percent, of which 9.0 percent in primary amino groups, 5.7 percent in secondary, and 0.1 percent in tertiary amino groups. This corresponded substantially to the theory for xylylene hexahydro-xylylene triamine. The molecular weight was 275 (theoretical value: 261). It was detected that half of the rings originating from xylylene diamine remained aromatic. The yield of polyamine was 60 percent.

EXAMPLE 2

1 mole of p-xylylene dichloride was dropped into a solution of 3 moles of hexahydro-p-xylylene diamine in xylene at a temperature of about 100°C and was allowed to react at a temperature of from 90° to 100°C for a further 3 hours, after the amount of aqueous sodium hydroxide solution of 40 percent strength calculated on the chloride had been added. Subsequently the water was removed by means of azeotropic distillation with xylene, the residue was separated from NaCl by suction filtration, and xylene as well as the excess of the starting diamine were distilled off in vacuo. The yield of remaining polyamine was 88.2 percent, calculated on the reacted p-xylylene dichloride. The nitrogen content determined by way of analysis was 13.7 percent, of which 6.5 percent originated from primary and 6.6 percent from secondary amino groups. The product did not show any signs of discoloration at 200°C. Molecular weight determined: 514 (theoretical value for the molecular weight of p-xylylene-di-hexahydro-p-xylylene-tetramine: 506).

If in this Example p-xylylene diamine was used, instead of hexahydro-p-xylylene diamine, a polyamine was obtained which did not contain partly cycloaliphatic, but only aromatic rings in the molecule chain.

The product had an amine number of 101 (theoretical value for tetramine: 107) and was thermally instable; it exhibited signs of discoloration and resinified at a temperature of 200°C.

What is claimed is:

1. A polyamine of the formula

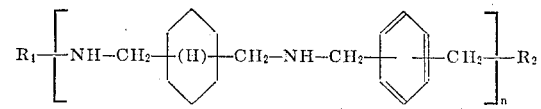

in which $n$ represents a whole number of from 1 to 3, $R_1$ represents H or

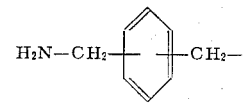

and $R_2$ represents $NH_2$ or

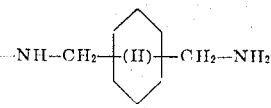

* * * * *